US008509109B2

(12) United States Patent
Guo et al.

(10) Patent No.: US 8,509,109 B2
(45) Date of Patent: Aug. 13, 2013

(54) METHOD FOR DISCOVERING AND MAINTAINING ROUTES IN SMART METER NETWORKS

(75) Inventors: Jianlin Guo, Newton, MA (US); Ghulam M Bhatti, Mansfield, MA (US); Philip Orlik, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 213 days.

(21) Appl. No.: 13/170,005

(22) Filed: Jun. 27, 2011

(65) Prior Publication Data

US 2012/0327792 A1 Dec. 27, 2012

(51) Int. Cl.
*G06F 11/00* (2006.01)
*H04L 12/28* (2006.01)
(52) U.S. Cl.
USPC .......................................... 370/252; 370/255
(58) Field of Classification Search
USPC .......................................... 370/351, 389, 392
See application file for complete search history.

(56) References Cited

U.S. PATENT DOCUMENTS

| 6,154,444 | A | 11/2000 | Masuo et al. |
| 8,233,420 | B2 * | 7/2012 | Choi et al. ................... 370/311 |
| 2008/0069118 | A1 * | 3/2008 | Monier ....................... 370/400 |
| 2009/0161594 | A1 | 6/2009 | Zhu et al. |
| 2009/0238100 | A1 * | 9/2009 | Gorman ...................... 370/254 |
| 2010/0232416 | A1 * | 9/2010 | Mack-Crane et al. ........ 370/351 |
| 2011/0069665 | A1 * | 3/2011 | Erdmann et al. ............. 370/328 |
| 2011/0176416 | A1 * | 7/2011 | Bhatti et al. ................. 370/230 |
| 2012/0307629 | A1 * | 12/2012 | Vasseur et al. ............... 370/228 |

FOREIGN PATENT DOCUMENTS

| WO | 9920016 A | 4/1999 |
| WO | 2006006117 A1 | 1/2006 |
| WO | 2008033275 A2 | 3/2008 |

* cited by examiner

*Primary Examiner* — Warner Wong
(74) *Attorney, Agent, or Firm* — Dirk Brinkman; Gene Vinokur (57) ABSTRACT

A set of routes are discovered in a network including concentrators, smart meters and an imaginary node. Each concentrator node, a source, broadcasts a route request (RREQ) packet to the imaginary destination node. Intermediate nodes store a route as a node list (NL) in the RREQ packet and as a route table (RT) in the node. Then, each smart meter node can select a primary route and a secondary route from the smart meter node to any concentrator from the route table.

12 Claims, 12 Drawing Sheets

METHOD FOR DISCOVERING AND MAINTAINING ROUTES IN SMART METER NETWORKS

FIELD OF THE INVENTION

This invention relates generally to routing of packets in wireless sensor networks, and particularly to routing packets in smart meter networks.

BACKGROUND OF THE INVENTION

Figure 1:
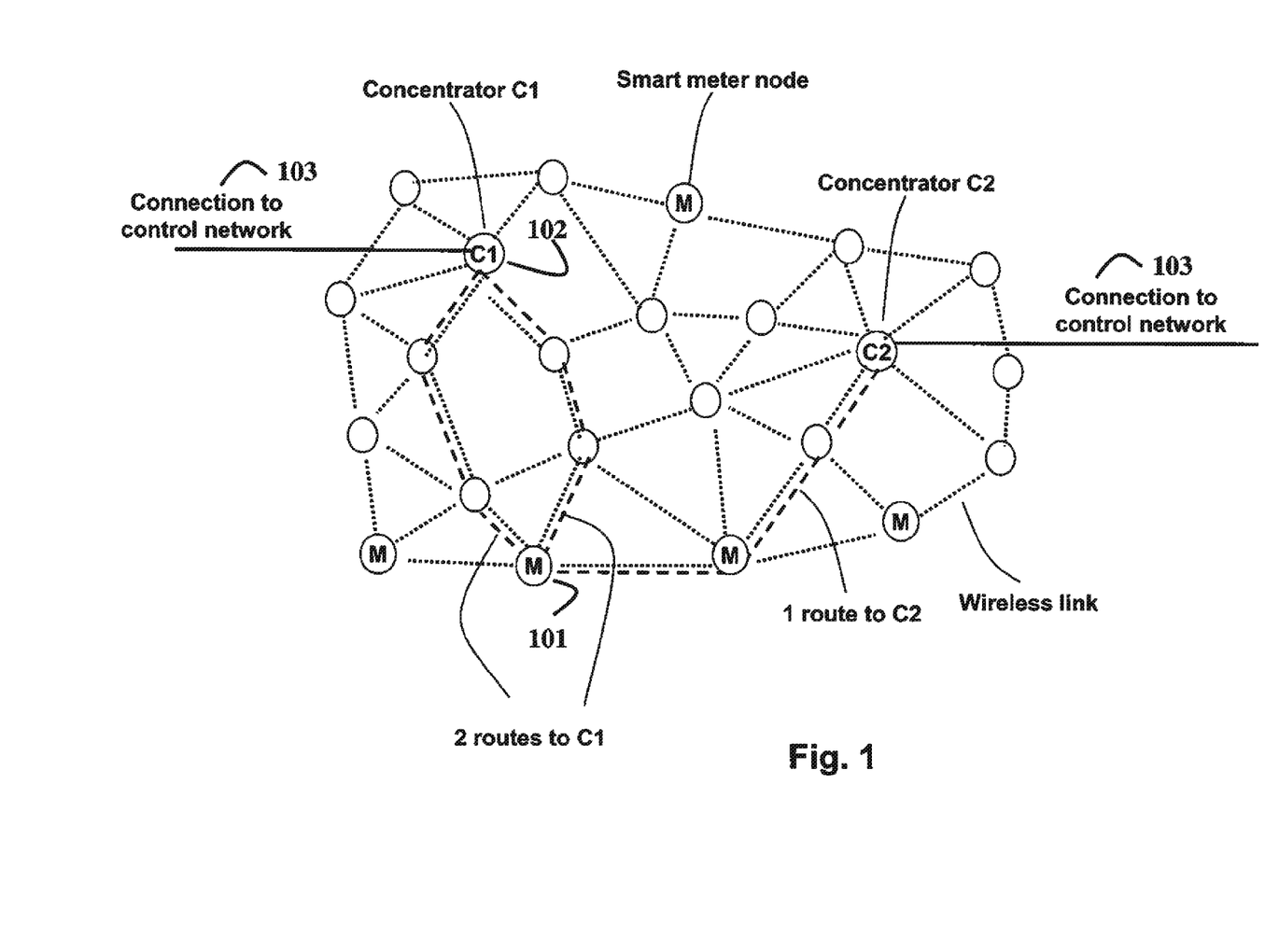
FIG. 1 is a schematic of a smart meter network in which embodiments of the invention operate.

A smart meter network is a sensor network for facilitating public utility services, such as electricity, water, and gas. As shown in FIG. 1, a smart meter network includes smart meter sensors (M) 101, and data concentrators 102 that are connected 103 to control networks, typically via a wired link. Communication between the smart meters and the concentrators typically uses wireless links for data and control packets. The sensors and concentrators are generally termed "nodes."

A smart meter network is distinguished from conventional sensor networks. The smart meter network can include thousands of smart meters, and only one or a few data concentrators. Both the smart meter and the concentrator are stationary, e.g., installed in homes and buildings. A smart meter periodically collects data and transmits the data via wireless links to one or more concentrators. The concentrators transmit the data to control networks of public utility service companies via wired links. The concentrator can transmit control commands to one or more smart meters. Data and control packets are reliably delivered to the concentrators and smart meters, respectively, with a low latency, such as a few seconds.

The smart meters and the concentrators form a large scale multi-hop mesh network, where packets may need to be relayed via other nodes. The manner in which the packets are relayed is critical. Therefore, reliable routes must be used.

A typical smart meter node M 101 can select concentrator C1 as its primary concentrator and concentrator C2 as a backup concentrator. Node 101 M has two routes to the primary concentrator and one route to the backup concentrator.

A number of routing methods are known for wireless sensor networks, and mobile ad hoc networks based on different requirements. Ad-hoc On-demand Distance Vector (AODV), Ad-hoc On-demand Multipath Distance Vector (AOMDV) and Dynamic Source Routing (DSR) are well known, However, those routing methods are not suitable for smart meter network because they are designed for homogeneous networks in which any node can be a source or destination. In addition, AODV is a single route method.

AOMDV tries to discover multiple disjoint routes between a source and a destination. However, the problem is that some node cannot discover the set of disjoint routes. As a result, AOMDV can only discover a single route for some nodes.

The main issue with DSR is that each packet includes route information, i.e., a node list. The node list increases the overhead in packet, especially when the route is long.

Furthermore, multiple network-wide broadcast floods to determine routes in those conventional routing methods make their communication overhead too high for large smart meter networks.

Routing Protocol for Low power and lossy network (RPL) is another routing method. RPL uses a directed acyclic graph (DAG) for route discovery. However, many important issues are left unresolved by RPL. For example, rank computation is not described for the RPL.

Therefore, it is desirable to develop a routing method for smart meter networks to deliver data packets and control packets reliably with very low latency.

SUMMARY OF THE INVENTION

The embodiments of the invention provide a method for discovering multiple loop-free routes in a large scale multi-hop mesh network that minimizes flooding. In the art, flooding means transmitting packets to all nodes in a network. Flooding can reduce network bandwidth, packets can also be duplicated or stuck in loops.

The embodiments of the invention use an imaginary destination node to discover the set of routes from all smart meter nodes to the concentrator nodes.

The set of bidirectional routes between each smart meter node and the concentrator are verified to guarantee reliable two-way communications.

A fault recovery method provides local route repair, and avoids interference with other packet transmissions.

DETAILED DESCRIPTION OF THE PREFERRED EMBODIMENTS

The embodiments of the invention provide a method for discovering a set of routes in a smart meter network. The network includes a set of smart meter nodes and a set of concentrator nodes. An imaginary node is also specified for the network. As defined herein, a "set" includes one or more members. Each concentrator node broadcasts a route request (RREQ) packet. The RREQ packet is received by all nodes because the destination for the RREQ packet is the imaginary node I. Hence, each intermediate node also rebroadcasts the RREQ packet, because it cannot be the imaginary destination node. Because the RREQ includes a route specified in a nodes list (NL), after the receiving and rebroadcasting the RREQ packets, each smart meter node has a set of routes specified in the received RREQ packets and stored in a route table (RT) at the node, from which to select primary and secondary routes.

We discover the set of loop-free routes while minimizing the number of broadcasted RREQ packet to reduce network-wide broadcast flooding, which can increase network resource requirements and interference. In fact, the broadcasting floods the network a number of times that is less than or equal to a number of the concentrators. Therefore, if the smart meter network has one concentrator, only one network-wide broadcast (flooding) is needed. Routes can be discovered on-demand, or periodically, or on demand.

To enable all smart meter nodes to discover the set of routes to the concentrator, all smart meter nodes are guaranteed to receive one or at least two copies of the RREQ packet broadcasted by the concentrator.

To distinguish our routing method from conventional routing methods, we first describe that route requests and route replies used in AODV, AOMDV, and DSR cannot meet the above requirement because some nodes cannot always propagate RREQ packets through the entire network.

Figure 2:
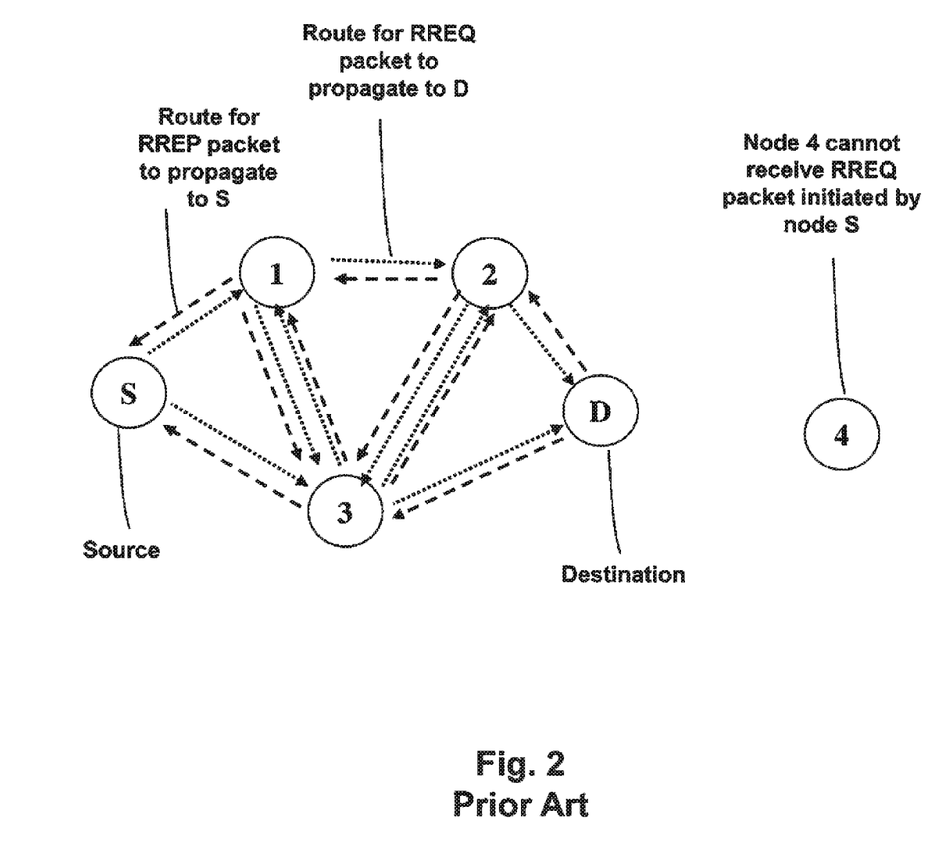
FIG. 2 is a schematic of an example of a network in which route request packet (RREQ) cannot propagate through the entire network.

As shown in FIG. 2, a source node S initiates route discovery by broadcasting the RREQ packet. The RREQ packet propagates to the destination node D via nodes along the set of routes, such as nodes S-1-2-D and S-3-D. While node D receives the RREQ packet, it does not rebroadcast the RREQ packet because it is destination.

Instead, the node D generates a route reply (RREP) packet and transmits the RREP packet to node S. Node D can unicast or broadcast the RREP packet along the set of routes to node S. Because node 4 is too far from nodes 1, 2, 3 and S, node 4 does not receive the RREQ packet from nodes 1, 2, 3, and S. Therefore, the RREQ packet does not propagate through to entire network.

Figure 3:
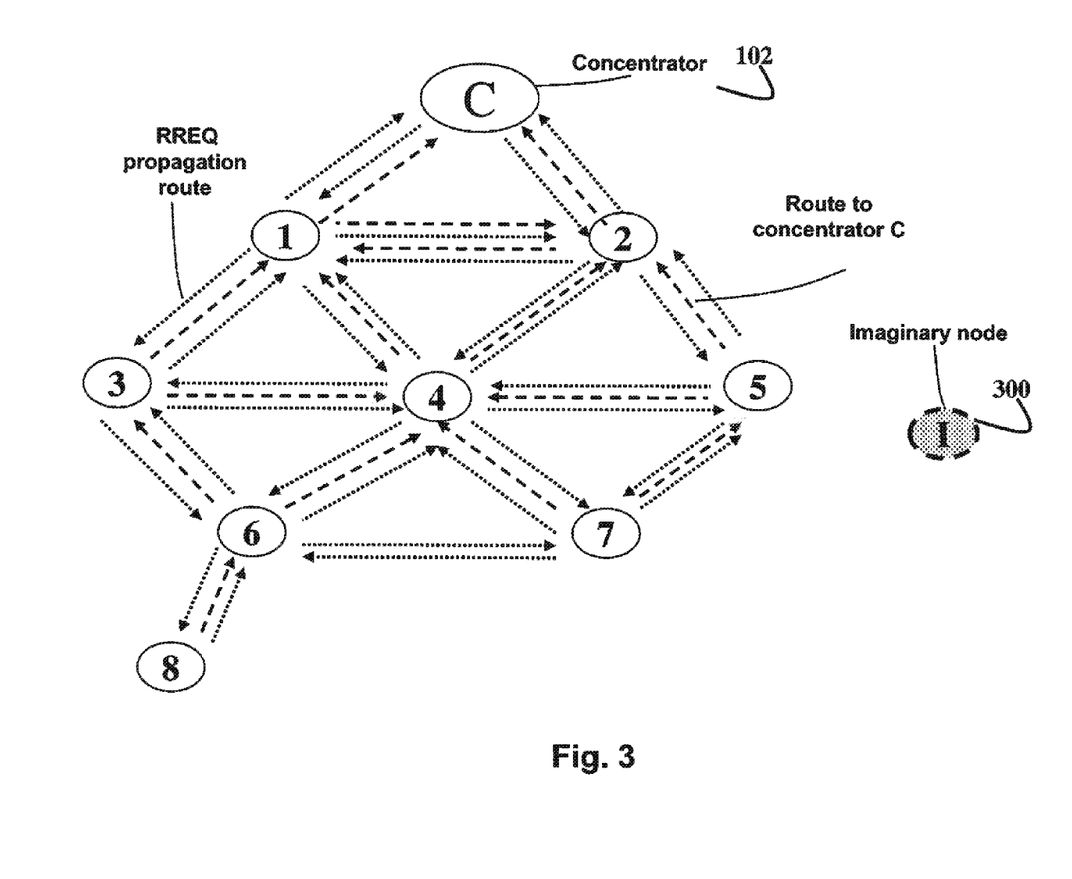
FIG. 3 is a schematic of an example of route discovery method to a destination node according of embodiments of the invention.

To make sure that RREQ packet propagates through to entire network, we use the imaginary node I 300 as the destination node as shown in FIG. 3. The imaginary node I does not actually exist physically in the network, and hence the imaginary node cannot be reached by any node, including the concentrator, during route discovery. Therefore, when the concentrator C broadcasts the RREQ packet, all real nodes in the network cannot be the destination node. As a result, each node has to rebroadcast the RREQ packet, and each node must receive a copy of the RREQ packet. This guarantees that the RREQ packet must propagate through the entire network. FIG. 3 also shows the set of loop free routes from each smart meter node to the concentrator.

For the simplest explanation, we describe our route discovery method by using a smart meter network with one concentrator. Also, each smart meter node discovers two routes to the concentrator. However, our route discovery method can be applied to networks with the set of concentrators and the set of routes.

Initial Route Discovery

FIGS. 7A-7F show fields of various packets used by embodiments of the invention.

Figures 7A, 7B:
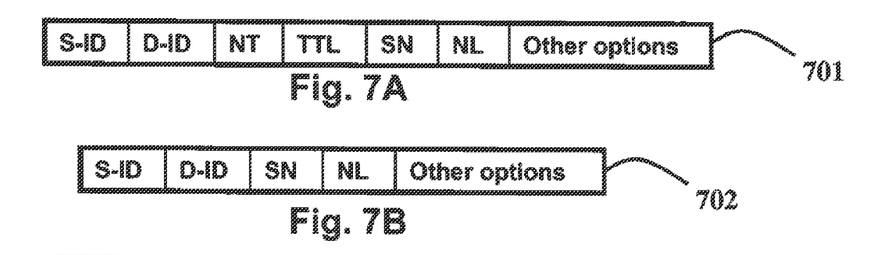
FIG. 7A is a block diagram of a format of RREQ packet according of embodiments of the invention.
FIG. 7B is a block diagram a format of route reply (RREP) packet according of embodiments of the invention.

The concentrator initiates route discovery by broadcasting the RREQ packet 701. As shown in FIG. 7A, the RREQ packet includes a source identification (S-ID), destination identification ID (D-ID), node type (NT), a time to live (TTL), a node list (NL), sequence number (SN), and other options. NT indicates if the RREQ packet is initially broadcasted by a concentrator or a smart meter. The length of NL is variable and is initially set to 0. Each node also maintains a number of routes (NR) variable to count the number of routes discovered. The NR is also initialized to 0.

Assume that IDs for concentrator and imaginary node are C-ID and I-ID, respectively.

To initiate route discovery, the concentrator sets S-ID to C-ID, D-ID to I-ID, i.e., the imaginary node I, NT to C (concentrator), TTL to a predefined value, SN to 0, and NL to empty. Then, the concentrator broadcasts the RREQ packet.

FIGS. 4A-4F show details of initial route discovery according to embodiments of the invention.

Figure 4A:
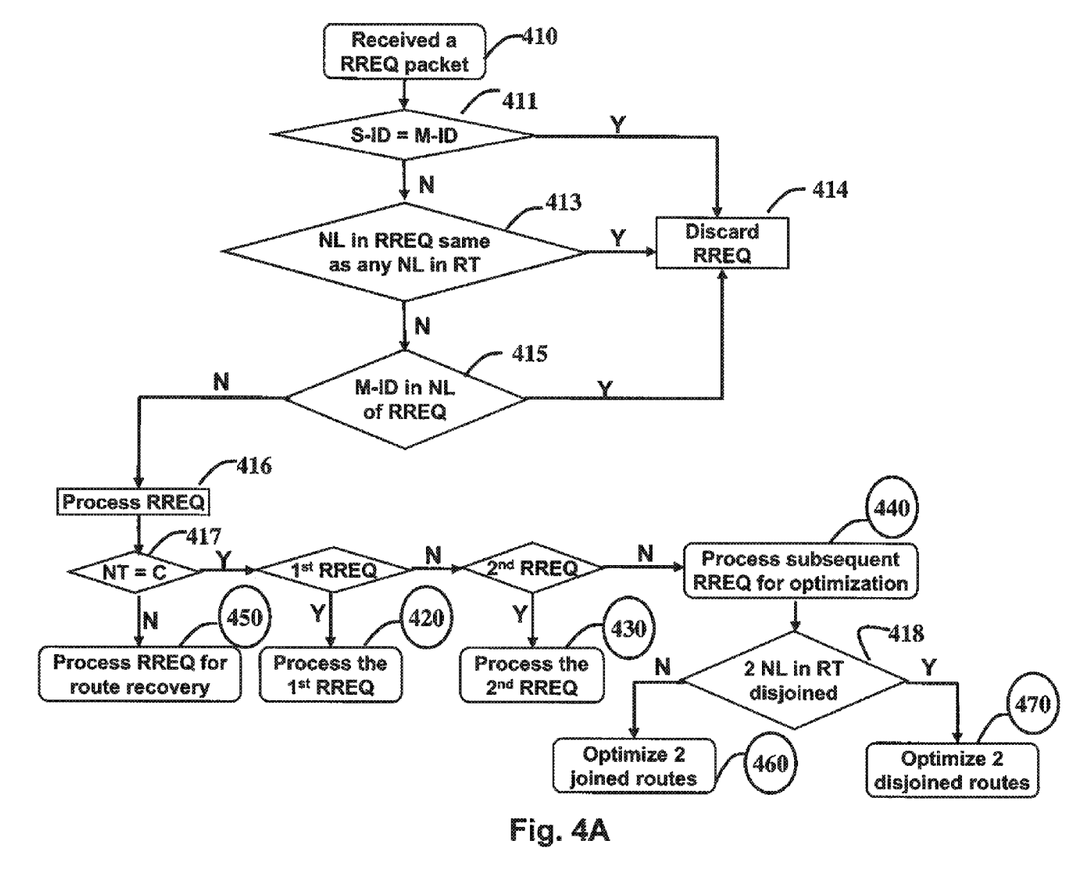
FIG. 4A is a flow diagram of a process of filtering and processing a RREQ packet according of embodiments of the invention.

As shown in FIG. 4A, after a node with the ID equal to M-ID receives 410 the RREQ packet, the node first performs a filtering procedure. The node checks 411 if S-ID equals its own ID, that is, M-ID. If yes, the RREQ packet is discarded 414. If no, the node determines if the NL in RREQ is same as any NL stored in the RT. If yes, discards 414 the RREQ packet. If no, the node checks 415 if its own ID is in NL of RREQ packet. If yes, this is a loop and the RREQ packet is discarded 414. If no, the node processes 416 the RREQ packet. Depending on 417 if RREQ packet is initially broadcasted by concentrator, the RREQ process consists of 420 processing the $1^{st}$ RREQ, 430 processing the $2^{nd}$ RREQ, 440 processing subsequent RREQ for optimization, and 450 processing RREQ for route recovery. Depending on 418 if two routes in the RT are disjoint, route optimization process is partitioned 460 optimizing joined routes and 470 optimizing disjoint routes. A node also processes multiple copies of same RREQ packet with different contents.

Figure 4B:
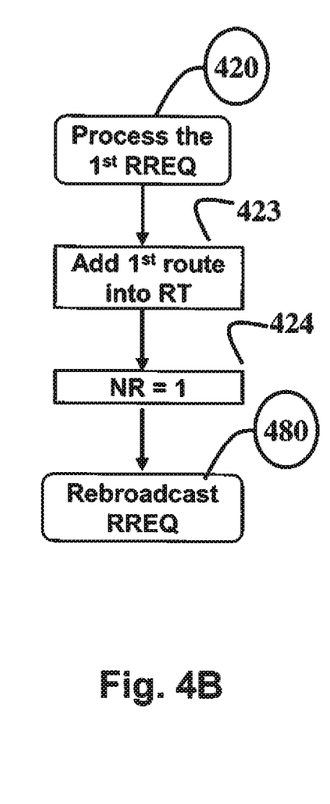
FIG. 4B is flow diagram of selecting a first route according of embodiments of the invention.
Figure 4C:
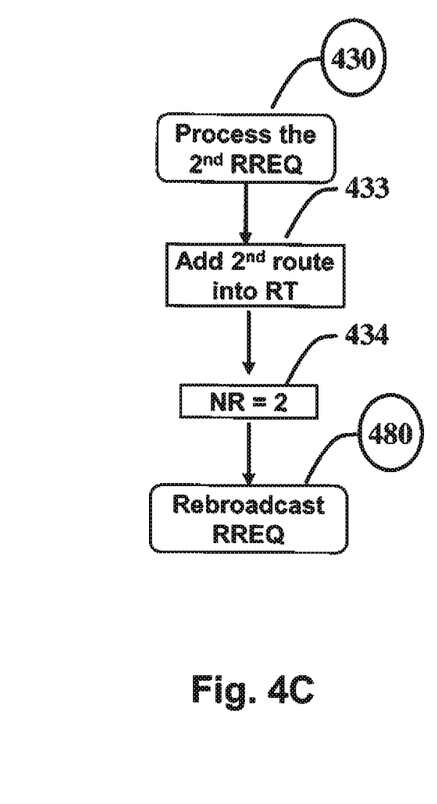
FIG. 4C is a flow diagram of a process at a node for selecting a second route according of embodiments of the invention.

Selection of two routes is illustrated by FIGS. 4B and 4C. Process 420 selects the first route, adds 423 the first route to the RT, sets 424 NR to 1, and rebroadcasts 480 the RREQ packet.

Process 430 selects the second route, adds 433 the route to the RT, sets 434 NR=2, and rebroadcasts 480 the RREQ packet.

Figure 4D:
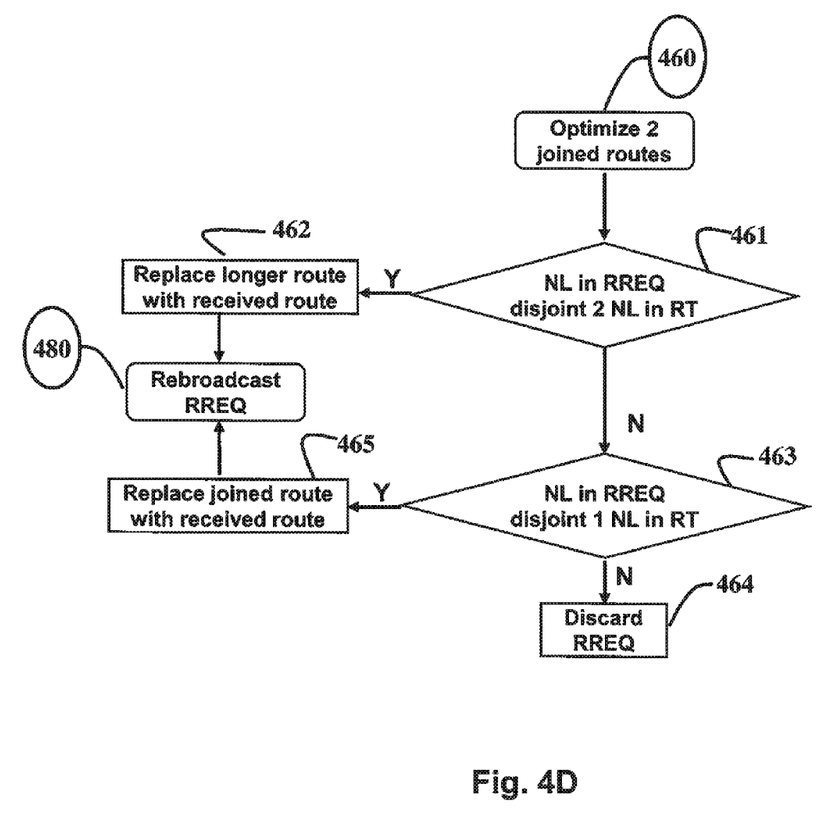
FIG. 4D is a flow diagram of a process of at a node for optimizing joined routes according of embodiments of the invention.
Figure 4E:
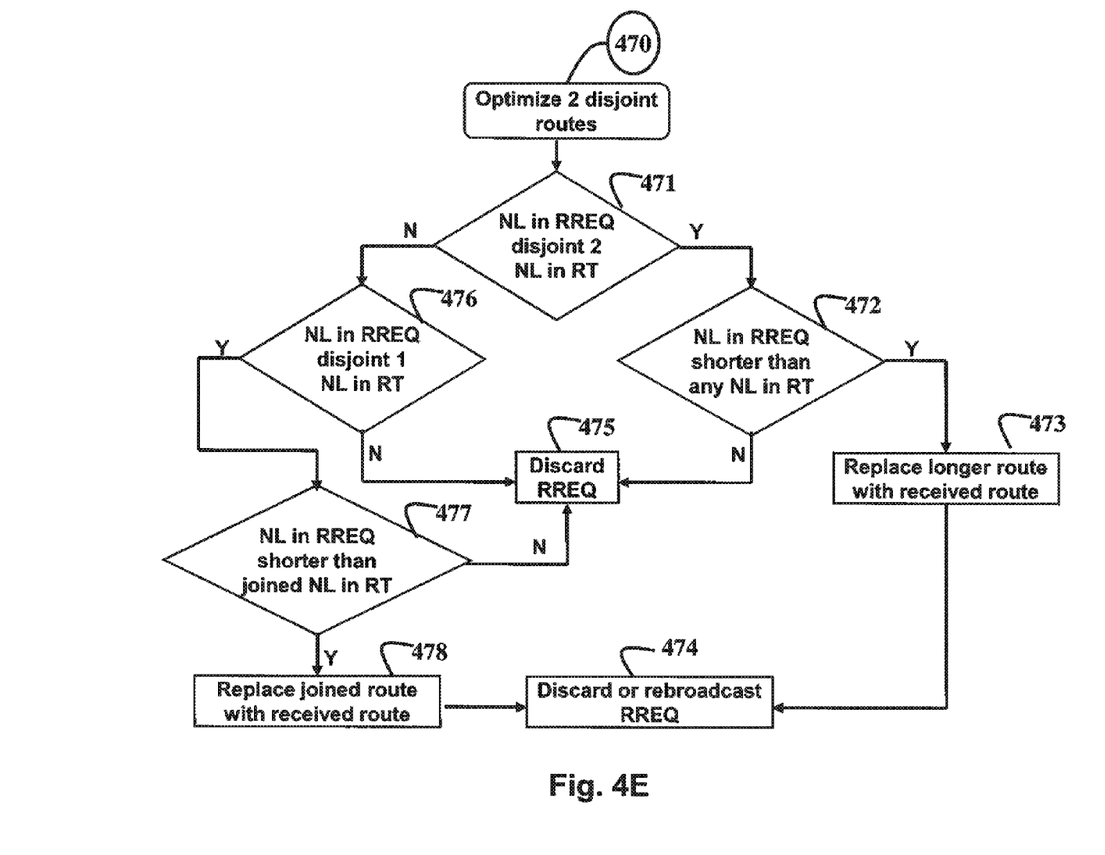
FIG. 4E is a flow diagram of a process at a node for optimizing disjoint routes according of embodiments of the invention.

Subsequently received RREQ packets are used for route optimization as shown in FIGS. 4D and 4E.

Process 460 optimizes two joined routes. In this case, two routes in the RT are joined, and the optimization is to select two possible disjoint routes. If route in RREQ disjoint 461 from both routes in the RT, the longer route in the RT is replaced 462 with route in RREQ, and RREQ is rebroadcasted 480. If route in RREQ 463 disjoint from only one route in the RT, the route in the RT that joins route in RREQ is replaced 465 with route in RREQ, and RREQ is rebroadcasted 480. If route in RREQ joins both routes in the RT, RREQ 464 is discarded.

Process 470 optimizes two disjoint routes. In this case, two routes in the RT are disjoint, and the optimization selects two shorter disjoint routes. If route in RREQ is disjoint 471 both routes in the RT and is shorter 472 than any route in the RT, the longer route in the RT is replaced 473 with route in RREQ, and RREQ can be discarded or rebroadcasted 474. If route in RREQ 476 disjoins only 1 route in the RT and is shorter 477 than route in the RT that joins it, the route in the RT that joins route in RREQ is replaced 478 with route in RREQ, and RREQ can be discarded or rebroadcasted 474. Otherwise, REEQ 475 is discarded.

Figure 4F:
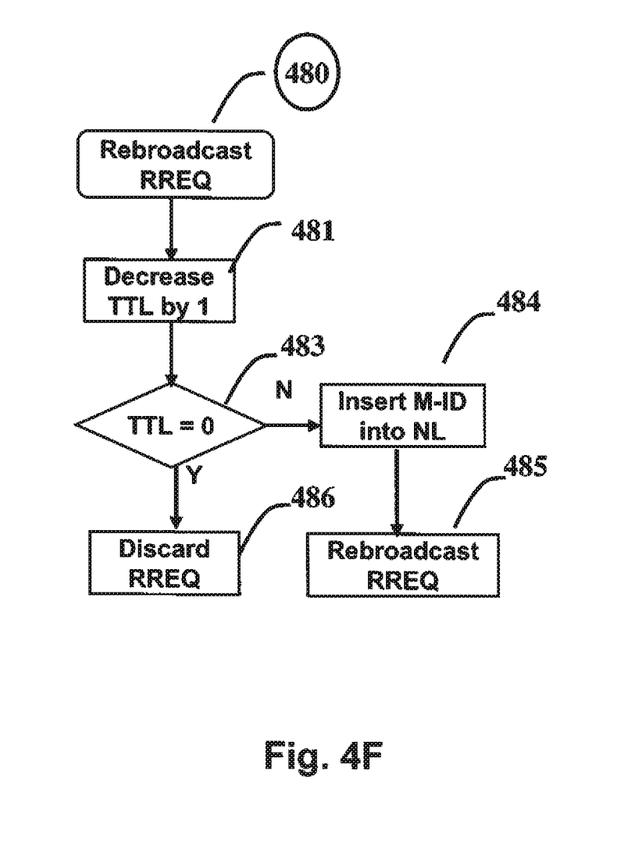
FIG. 4F is a flow diagram of a process of rebroadcasting the received RREQ packet according of embodiments of the invention.

Process 480 is to perform the RREQ rebroadcast as shown in FIG. 4F. TTL is decreased 481 by 1. If 483 TTL is zero, RREQ is discarded 486. Otherwise, the node ID, M-ID, is 484 inserted into NL in RREQ, and RREQ is 485 rebroadcasted.

There are many ways to select two routes, such as two shortest routes, or two disjoint routes, or two cost efficient routes. AOMDV tries to discover multiple disjoint routes. However, some nodes cannot discover multiple disjoint routes in some cases.

Figure 5:
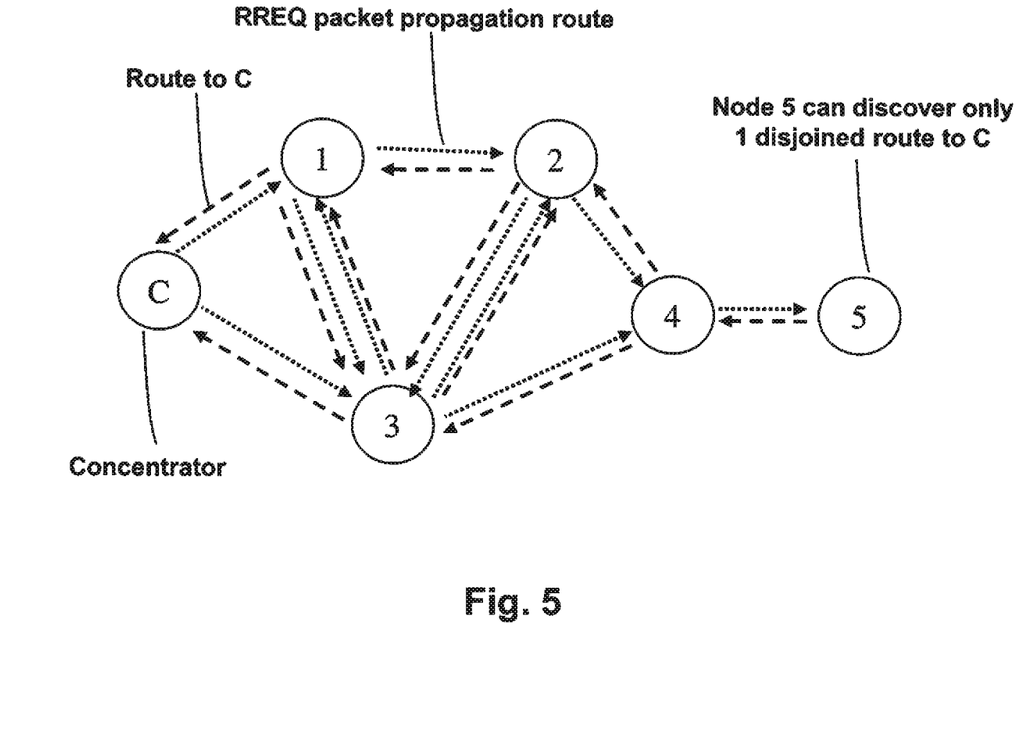
FIG. 5 is a flow diagram of an example where a node cannot find two disjoint routes.

As shown in FIG. 5, node 5 cannot find two disjoint routes. Two routes are disjoint if the routes do not have a node in common, other than the source and destination.

In the embodiments of our invention, a node can select routes according to the following criteria or combinations thereof:

an order in which the routes were discovered, e.g., the first route is the primary route, and subsequent routes are selected as secondary routes;

a level of disjointedness of the routes because disjoint routes fail independently. The level of disjointedness is determined by the number of nodes common to the routes. If the routes have no nodes in common, then the routes are completely disjoint;

a number of hops in the route, because shorter routes are generally more reliable and efficient;

an average packet drop rate, i.e., reliability of the route;
buffering capacity in the route; and
expected transmission delay.

Depending on the number of routes to be discovered, the first route or the first few routes in the NL are added to the RT. When the node receives the subsequent copies of RREQ packet, the node optimizes its possible routes. Selecting disjoint routes is the first choice because disjoint routes fail independently. If there are multiple pairs of two disjoint routes, then two shortest disjoint routes are selected. In the case, a node cannot discover two disjoint routes, two joined routes are selected.

As shown in FIG. 3, node 7 can select two routes: 7-5-2-C and 7-4-1-C. Node 8 cannot discover two disjoint routes. It can select two joined routes: 8-6-4-2-C and 8-6-3-1-C.

To guarantee all nodes can discover two routes, each node must rebroadcast at least two copies of the RREQ packet. There are many ways to select two copies of RREQ packet for rebroadcasting. For example, the first copy of the RREQ and a subsequent copy of RREQ with shorter route. However, this selection can prevent some node from discovering the set of routes. As shown in FIG. 5, if node 4 receives RREQ packet via route C-3-4 first, all subsequent copies of RREQ packet contain longer routes. As a result, node 5 can only discover one route.

In this invention, the first two copies of RREQ are rebroadcasted by each node. Subsequent copy of RREQ is rebroadcasted only if two routes in the RT are joined and with the route contained in received RREQ packet, two disjoint routes can be selected. Otherwise, it is an option to rebroadcast subsequent copy of RREQ.

To reduce rebroadcast transmission, starting from the $2^{nd}$ rebroadcast, the TTL of RREQ can be set to a smaller value such as one or two.

Aggregated Route Verification

The smart meter network requires two-way communication between the concentrator and a smart meter node. However, a wireless link, at any one time, can work only in one direction. Routes discovery uses a broadcasts. Therefore, these routes must be verified before being used for data packet or control packets at a later time, and perhaps a different communication environment.

Figures 7C, 7D:
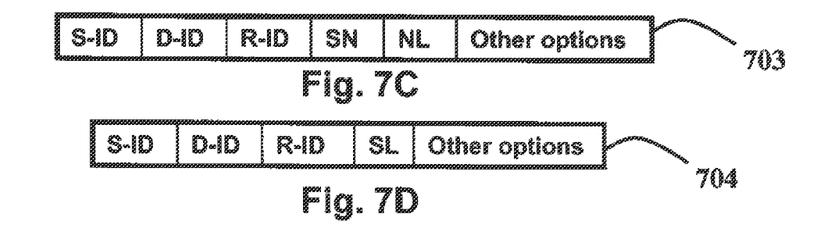
FIG. 7C is a block diagram a format of route verification (RVF) packet according of embodiments of the invention.
FIG. 7D is a block diagram a format of route verification acknowledgement (RVFA) packet according of embodiments of the invention.

Route verification is performed by using a route verification (RVF) packet 703 and a route verification acknowledgement (RVFA) packet 704. As shown in FIG. 7C, the RVF packet includes the S-ID, D-ID, the route ID (R-ID), SN, NL, and other options. The R-ID identifies a route to a smart meter node. The smart meter node assigns a R-ID to each route. The (S-ID, D-ID, R-ID) uniquely identify a route within the network. NL specifies route to be verified and is obtained from the RT. The RVFA packet includes S-ID, D-ID, R-ID, SN, and other options. However, there is no NL field in RVFA as shown in FIG. 7D.

To verify a route, the smart meter node unicasts the RVF packet to the concentrator along the route specified by NL in RVF packet. Upon receiving the RVF packet, the concentrator stores route information and unicasts the RVFA packet to the smart meter node along a reverse route contained in the RVF packet. When the smart meter node receives the RVFA packet, the route has been verified as a two-way communication route.

The concentrator can use a stored route to transmit a control packet to any node on the reverse route. Also, any smart meter node on the route can use this route to transmit a data packet to the concentrator.

The RVF and the RVFA packets are relayed by intermediate nodes. When a node in NL receives the RVF packet, the node stores this route in the RT and forwards the RVF packet to the next node on the route. The stored route serves for three purposes:

relaying the RVFA packet to the source node;
for data packet and control packet transmission; and
for route verification.

For example, if a route to be verified is S-1-2-3-D and node 1 has a route 1-2-3-D, when node 1 receives the RVFA packet destined for node S, node 1 has also verified its route 1-2-3-D. Therefore, node 1 does not verify the route 1-2-3-D.

Figure 6:
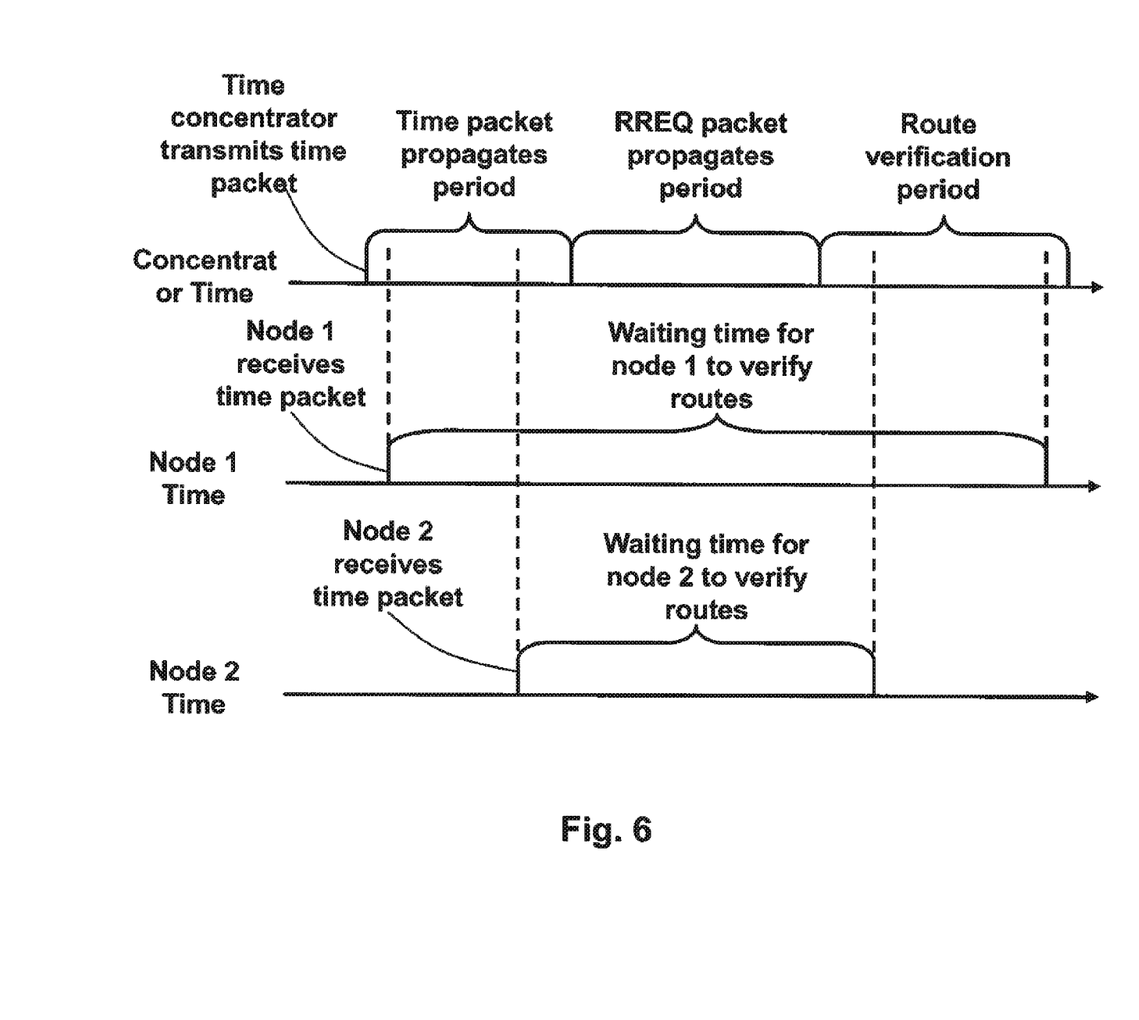
FIG. 6 is a timing diagram of verifying routes according to embodiments of the invention.

It is preferred that longer routes are verified first, see FIG. 6. This increases the possibility that shorter routes are verified as part of longer route verification. This aggregated route verification also reduces communication overhead.

Route Recovery

In contrast with conventional sensor networks, the smart meter network is relatively stable. First, all the nodes are stationary, and not subject to other issues associated with mobile sensor nodes. In addition, the topology of the network generally remains constant for long periods of time, unlike ad-hoc sensor networks. For example, after a smart meter is installed in a building, it may remain in place for many years. The topology only changes as nodes join or leave the network, which is relatively infrequent.

Thus, a route can be used until it fails. However, because there are multiple routes between a smart meter node and the concentrator, the smart meter node selects one route as its primary route and selecting other routes as secondary routes. In other words, a set of routes is discovered. The set includes the primary route and secondary routes. The primary route is used for delivering data packet to the concentrator. The concentrator can use the primary route to deliver control packets.

To perform route recovery smoothly, a smart meter node monitors its neighbor's traffic pattern to determine a time period in which no neighboring node transmits. This time period is called an idle time period. In the smart meter network, the data packet is transmitted periodically and nodes are stationary. Therefore, such idle time period can be detected.

When a node detects that the primary route has failed, it uses one of the secondary routes for data packet delivery, and discovers another route for the set. To do so, the node broadcasts the RREQ packet locally. The node sets S-ID to its ID, D-ID to C-ID, NT to M (meter), TTL to 1, SN to 0, and NL to empty. To reduce interference with other data packet transmission, this RREQ packet is not transmitted immediately. Instead, the node broadcasts the RREQ packet during the idle time period.

Figure 4G:
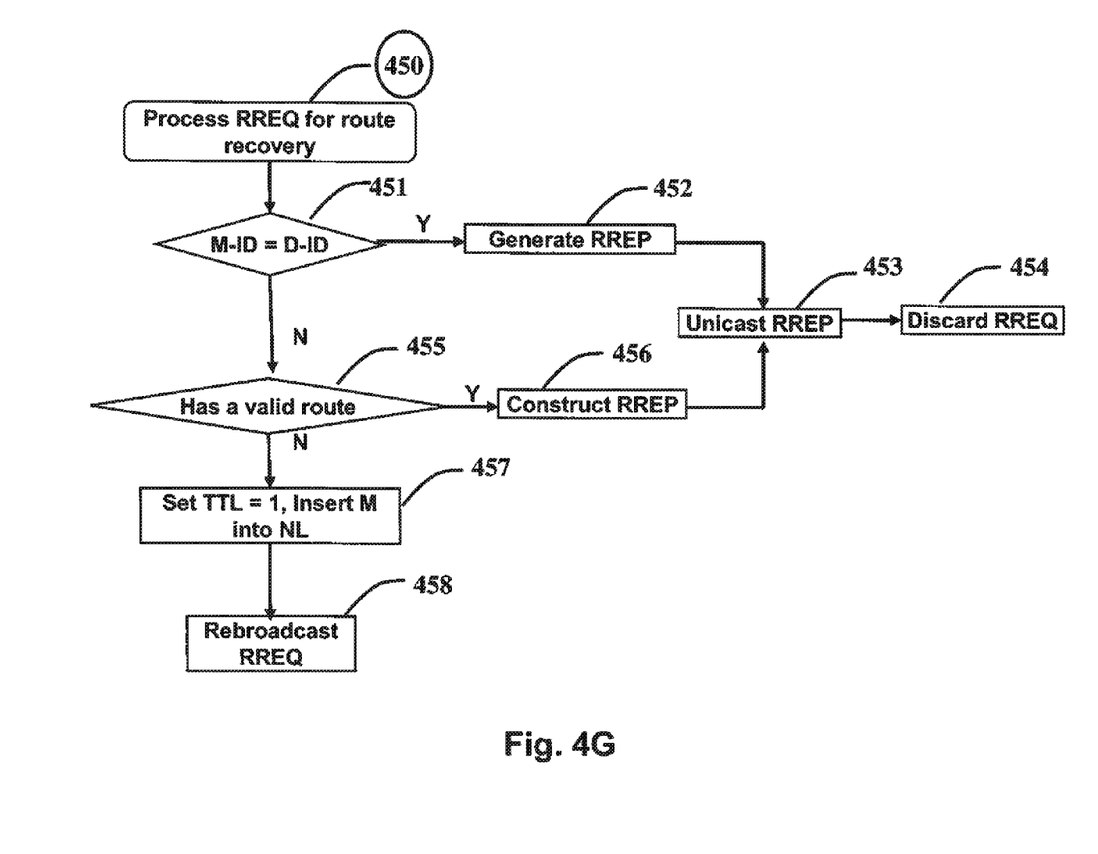
FIG. 4G is a flow diagram of processing the received RREQ packet sent for route recovery according of embodiments of the invention.

FIG. 4G is a flow diagram of a process of a node processing the received RREQ packet sent for route recovery according of embodiments of the invention. Each neighbor with a node ID equal to M-ID processes the received RREQ packet destined for the concentrator.

If M-ID equals 451 D-ID in the RREQ packet, this node is destination concentrator. The concentrator generates 452 a RREP packet 702 as shown in FIG. 7B, and sets S-ID to its ID, D-ID to S-ID contained RREQ packet, SN to 0, and NL to the NL contained in RREQ packet.

The concentrator then unicasts 453 the RREP packet along route specified by NL field in RREP, and discards 454 the RREQ packet. Similarly, RREP packet is also transmitted in idle time period.

If the receiving node is not the concentrator, then the node checks if it 455 has a valid route to destination concentrator. If yes, it constructs 456 the RREP packet by setting S-ID to its ID, D-ID to S-ID contained RREQ packet, SN to 0. NL is constructed by attaching NL contained in RREQ packet to reverse NL in its route to destination concentrator. It unicasts 453 RREP packet back to source node via route specified by NL contained in RREQ in idle time period, and discards 454 RREQ packet.

If a smart meter node has no valid route, it updates 457 the RREQ packet by inserting its ID into NL and setting TTL to 1, and rebroadcasts 458 the RREQ packet in the idle time period.

Unlike conventional routing methods, a node does not select a reverse route if the RREQ packet is initially rebroadcasted by a smart meter node.

When source node receives RREP packet, the node reverses the NL contained in the RREP packet, assigns a R-ID and stores the route into the RT. The node must verify the route to ensure that the route is valid two-way communication path.

In case of there is no idle time period, the transmission of the RREQ and the RREP packets depends on the implementation.

In case both the primary and all the secondary routes fail, the node buffers the data packet and discovers another set of routes.

Route Maintenance

The route between the smart meter and the concentrator is discovered and verified before a data packet or control packet is transmitted. In the case that a node has a packet to transmit without a valid route, the node must discover a set of routes as described in route recovery.

When a new node joins network, it also follows the procedure described in route recovery section to discover a set of routes.

Secondary routes can be verified dynamically or periodically because a communication link can fail at any time. This route verification is performed by using the idle time period as much as possible.

If the secondary route has failed, the node must discovery another secondary route as described in the route recovery section.

Timing Considerations

There can be three phases in which the smart meter network operates:

Phase-1: network formation;
Phase-2: routing discovery and route verification; and
Phase-3: data packet and control packet transmission.

In phase-1 network formation, smart meter nodes join the network. To join a network, the smart meter node acquires basic network information, such as node ID, channels used for communication, concentrator IDs, and the like.

After the network is formed, one of concentrators can broadcast a time packet to be used by smart meter nodes to estimate when route verification starts.

Figure 7E:
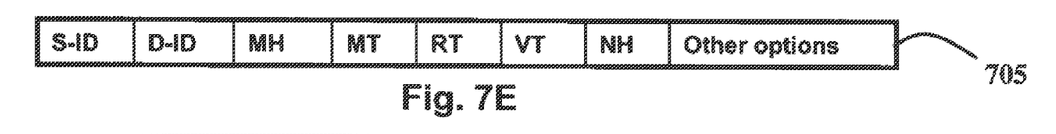
FIG. 7E is a block diagram of a format of a timing packet according of embodiments of the invention.

As shown in FIG. 7E, the time packet 705 includes the following field: S-ID, D-ID, MH (the maximum number of hops allowed), MT (the maximum time needed to propagate the time packet thought the entire network), RT (the maximum time needed to propagate the RREQ packet through the entire network), VT (the maximum time needed to verify all routes), NH (the number of hops time packet traveled), and other options. The NH is initially set to 1 and increased by 1 each time when time packet is rebroadcasted. Each node rebroadcasts time packet only once.

The concentrator sets S-ID to its ID, D-ID to I-ID. MT, RT and VT are estimated by using the predefined MH and media access control and physical (MAC/PHY) protocol used.

The time packet is rebroadcasted through the entire network by the smart meter nodes because the imaginary node is the destination of that packet.

Upon receiving time packet, the smart meter node sets a wait time (WT) for route verification as following:

$$WT = RT + \frac{MH - NH}{MH} * (MT + VT).$$

As shown in FIG. 6, the WT allows smart meters with longer routes to verify routes earlier. After the concentrator transmits the time packet, there are periods to propagate the time packet, the RREQ packet, and verification. After nodes receive the time packet, there are waiting periods to verify the routes. As shown in FIG. 6, node 1 receives the time packet before node 2 does, because the NH for node 1 is smaller than that for node 2. However, node 2 starts route verification earlier than node 1 does.

Data Packet and Control Packet Transmission

Figure 7F:
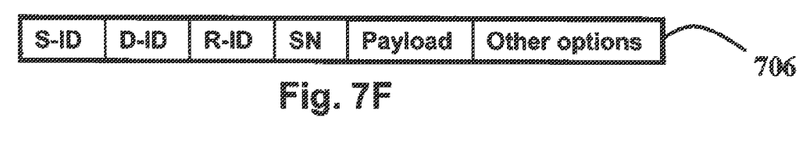
FIG. 7F is a block diagram a format of data packet and control packet according of embodiments of the invention.

The format of the data packet and the control packet 706 is shown in FIG. 7F. Unlike for DSR, the NL is not included in the data packet or the control packet. The packet does include a payload. The source node uses the primary route for transmitting the data packet and the control packet. It transmits the packet to the next hop node by using the route information in the RT. When a node receives a data packet or a control packet, it uses (S-ID, D-ID, R-ID) to identify the route and lookup the next node from routes stored in the RT to forward the packet.

For example, node S has two routes to a concentrator C: R1 (S-1-2-3-C) and R2 (S-1-4-5-6-7-C). Node S uses R1 to transmit the data packet to concentrator C. Node S transmits the packet to node 1. Node 1 stores two routes for node S because node 1 is on both routes of node S. By checking the R-ID field of the received data packet, node 1 knows that R1 should be used. Therefore, node 1 forwards the data packet to node 2. Node 2 stores 1 route for node S with the R-ID equal to 1. By checking the R-ID field of received data packet, node 2 knows that R1 is correct route. Therefore, node 2 forwards the data packet to node 3.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for discovering a set of routes in a network, wherein the network is a smart meter wireless network that includes a set of smart meter nodes and a set of concentrator nodes, comprising the steps of:

specifying an imaginary node in the network, wherein the imaginary node does not actually exist physically in the network, and cannot be reached by any node including the concentrator node during route discovery;

broadcasting, by each concentrator node, a route request (RREQ) packet, wherein the RREQ indicates that the concentrator node is a source node for the RREQ packet, and the imaginary node is a destination node for the RREQ packet, wherein the RREQ packet includes a node list (NL), wherein the NL includes identifications of the smart meter nodes that received the RREQ packet;

receiving the RREQ packet in each smart meter node, assigning a route ID to the route in the NL, and storing the NL in the RREQ packet in a routing table (RT);

rebroadcasting the RREQ at least once by each smart meter node;

receiving the rebroadcast RREQ packet in each smart meter node, and storing the NL in the rebroadcast RREQ packet in the RT; and selecting, in each smart meter node, a primary route and a secondary route from the smart meter node to each concentrator from the route table stored in the smart meter node.

2. The method of claim 1, wherein the selected routes are loop free.

3. The method of claim 1, wherein selected routes are disjoint.

4. The method of claim 1, wherein the primary and secondary routes are selected among the routes discovered.

5. The method of claim 1, wherein the primary and secondary routes are selected based on a level of disjointedness of the routes.

6. The method of claim 1, wherein the primary and secondary routes are selected based on a number of hops in the routes.

7. The method of claim 1, further comprising:
verifying the primary and the secondary routes;
storing verified routes for data and control packet transmission.

8. The method of claim 1, further comprising:
transmitting a data packet from a particular smart meter node to the concentrator node using the primary route.

9. The method of claim 1, further comprising:
transmitting a control packet from the concentrator node to a particular smart meter node.

10. The method of claim 8, wherein a route repair packet is transmitted during an idle time period.

11. The method of claim 8, wherein the secondary route is used if the primary route fails.

12. The method of claim 1, wherein selected routes are disjoint, after a predetermined waiting time.

* * * * *